United States Patent [19]
Offenbacher et al.

[11] Patent Number: 4,776,869
[45] Date of Patent: Oct. 11, 1988

[54] METHOD FOR PREPARING SUBSTRATES FOR OPTICAL SENSORS

[75] Inventors: Helmut Offenbacher; Herbert Kroneis, both of Graz, Austria

[73] Assignee: AVL AG, Schaffhausen, Switzerland

[21] Appl. No.: 53,617

[22] Filed: May 26, 1987

[30] Foreign Application Priority Data

May 28, 1986 [AT] Austria ................... 1451/86

[51] Int. Cl.$^4$ ............................................. C03C 15/00
[52] U.S. Cl. ............................. 65/31; 65/111; 156/663; 501/66
[58] Field of Search ............... 65/31, 111; 501/66; 156/663

[56] References Cited

U.S. PATENT DOCUMENTS

| | | | |
|---|---|---|---|
| 2,221,709 | 11/1940 | Hood et al. | |
| 3,113,855 | 12/1963 | Elmer | 65/31 |
| 4,080,188 | 3/1978 | Doddato et al. | 65/31 |
| 4,657,875 | 4/1987 | Nakashima | 501/66 X |

FOREIGN PATENT DOCUMENTS 3343636  6/1984  Fed. Rep. of Germany.

Primary Examiner—Robert L. Lindsay
Attorney, Agent, or Firm—Watson, Cole, Grindle & Watson

[57] ABSTRACT

Bodies of borosilicate glass with a $B_2O_3$ content of less than 13 percent by weight are provided with a microporous layer of a thickness of 5 to 20 μm, and are thus turned into carriers for optical sensors. This process is characterized by the following steps. Thermal decomposition for 5 to 10 days at 500° to 560° C.; removal of the topmost layer of glass to a depth of at least 10 μm in the part of the surface to be rendered porous; leaching of the separated borate phase with diluted mineral acids for a minimum of 2 days at 70° to 98° C.; and after-treatment of the microporous layer, including (a) chemical treatment with concentrated sulphuric acid and concentrated nitric acid for 2 hours at 20° C., and (b) heat-treatment for 10 minutes to 2 hours at 450° to 700° C.

8 Claims, 4 Drawing Sheets

METHOD FOR PREPARING SUBSTRATES FOR OPTICAL SENSORS

BACKGROUND OF THE INVENTION

This invention relates to a method of preparing substrates for optical sensors used for measuring the concentrations, activities and partial pressures of samples.

DESCRIPTION OF THE PRIOR ART

The sensitive layer of such sensors contains an indicator dye whose optical properties will change upon interaction with the sample and which is immobilized on a transparent substrate with a large specific surface. This substrate constitutes a thin, microporous layer on a mechanically stable, transparent sensor carrier through which light interacting with the indicator dye is coupled in. Depending on the type of indicator, either the reflected light (absorption indicator) or the fluorescent light (fluorescent indicator) is coupled out via the sensor carrier; from the intensity of this measurement signal the parameter to be measured is inferred.

In order to ensure good resolution of the measurement signal the substrate must be capable of carrying a sufficiently large quantity of the indicator.

For determining ionic components the sample must directly interact with the indicator immobilized on the substrate, in accordance with the subsequent scheme, which will require a sufficiently large surface of the substrate.

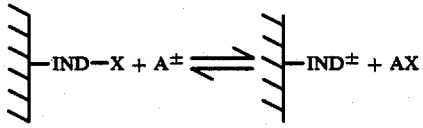

In the instance of chemical immobilization of indicator dyes it is recommended that microporous glass of a structure analogous to that of controlled porous glass (CPG) be used as a substrate.

CPG is a powder which does not easily adhere to the sensor carrier. A suitable way of bonding powdered microporous glass to transparent carriers is described in DE-OS No. 33 43 636. According to this method the microporous glass is sintered onto glass carriers that have been heated to their softening point, subsequent to which the indicator dye is immobilized thereon together with its specific microenvironment.

CPG is obtained by thermal decomposition of borosilicate glass and by subsequently washing or "leaching" the separated borate phase with diluted acids, preferably 3 nHCl. The remaining $SiO_2$ backbone has a worm structure and is characterized by an extremely large specific surface.

In accordance with the phase rule of Gibbs there are three liquid phases in the miscibility gap of the ternary system $SiO_2$—$B_2O_3$—$Na_2O$, the individual phases permeating each other as worm-like decomposition structures.

In addition to the fabrication of CPG powder for the purpose of chromatography, etc., this method may be employed for the surface treatment of glassware and for rendering glass surfaces non-reflective.

For the surface treatment of glass borosilicate glassware is subject to decomposition and the separated phases, which are non-resistant to acids, are treated with diluted acids. The microporous structure of $SiO_2$ (>95%), which will remain as a layer of greater or lesser thickness, is condensed to non-porous silica glass at a temperature some 800° C. below the actual melting point of $SiO_2$ (re-vitrification). The glassware fabricated in this manner is known under the brand-name of VYCOR glass and is characterized by excellent resistance to chemicals and temperature stability.

The above kind of surface treatment of borosilicate glasses is described in U.S. Pat. No. 2,221,709, for instance.

U.S. Pat. No. 4,080,188 contains a description of microporous glass structures used for coating glass surfaces with an anti-reflective film. The process of decomposition described therein is completely identical with that described in U.S. Pat. No. 2,221,709. After decomposition the glass is provided with a porous surface to a depth of 1 μm at most; the remaining glass body is then heated to a temperature above that corresponding to the liquidus line (680° C.) in order to regain the state of the amorphous borosilicate glass. As a consequence, a non-reflecting microporous layer of $SiO_2$ will remain on the surface, with a pore diameter of 1000 Å at most. Suitable starting materials are borosilicate glasses with a $B_2O_3$ content of 13 to 16%.

Reconversion into the amorphous borosilicate glass is necessary since porosification will come to a standstill at the end of the acid treatment with 3 nHCl only if the separated and surface-porosified glass is kept dry. If there is any contact with moisture (condensation) the process of dissolution of the borate phase will continue slowly but steadily. As a result the material will be subject to further porosification, and the remaining $SiO_2$ or silicate backbone will be destroyed by reacting with the alkaline-reacting borate solution to be removed.

The process of reconversion into the amorphous borosilicate glass will lead to tensions in the boundary area between the microporous $SiO_2$ layer and the glass body, which will induce the anti-reflective layer to crack and fall off. In the above patent descriptions this problem is solved by growing thin microporous layers (1 μm), and by creating microporous structures with a high ratio of pore diameter to thickness of the silica layer, which is obtained by high $B_2O_3$ contents (13 to 16%).

SUMMARY OF THE INVENTION

The present invention is based on the idea that microporous sensor layers require a large surface capable of accommodating an indicator, i.e., a microporous layer of sufficient thickness and with a large specific surface. Since such sensors should have as small a rise time of the measured value as possible, i.e., equilibration of the sensor layer with the sample to be determined should take place as fast as possible, the optimum thickness of the substrate layer will be a compromise between signal intensity and signal response time. Measurements of the inventor show that the optimum thickness of the microporous layer is 5 to 20 μm.

Such thicknesses cannot be achieved with the methods indicated in the above patent description.

It is the object of the present invention to provide a method of preparing microporous substrates which will adhere to a transparent and mechanically stable sensor carrier in homogeneous layers of thickness ranging from 5 to 20 μm.

According to the invention a borosilicate glass core with a $B_2O_3$ content of <13 percent by weight and an alkali metal oxide content of $3.5\pm1.0$ percent by weight is processed in the following steps:

(a) Thermal decomposition in the temperature range of 500° to 560° C. The actual temperature is defined by the composition of the glass and should not vary by more than ±10° C.; processing time should be at least three days, preferably 5 to 10 days.

(b) Removal of the topmost layer of glass to a depth of preferably at least 10 μm in the area of the surface to be rendered porous.

(c) Leaching of the separated borate phase with diluted mineral acids for a minimum of 2 days at 70° to 98° C.

(d) After-treatment of the microporous layer:
chemical, with concentrated sulphuric acid and concentrated nitric acid, preferably for 2 hours at 20° C.;
heat-treatment, i.e., baking at 450° to 700° C., preferably for 10 minutes up to 2 hours; or in reverse order.

The borosilicate glasses indicated in the above patent description all are characterized by higher contents of boron oxide, i.e., greater than 13 percent by weight. In the decomposition stage of the glass these high $B_2O_3$ contents will lead to a continuous, worm-like decomposition structure of the interpermeating phases. Upon treatment with acids a porous structure is achieved whose thickness will depend on the duration of the leaching process.

If the content of boron oxide in the glass is reduced to less than 13 percent, preferably 3.5 to 11 percent, it has unexpectedly proved possible to produce isolated zones of decomposition by heat-treatment of the glass, which again are characterized by a worm-like structure, and which will interpenetrate one another in an amoeba fashion, while remaining unconnected. The individual decomposition zones have an irregular shape, with a mean diameter of 5 to 20 μm, depending on $B_2O_3$ content, decomposition time and decomposition temperature, and are separated from one another by silicate skins of a thickness of 1 μm. At the subsequent process of porosification only decomposition zones in contact with the acid are washed out; the adjoining decomposition zones are not subject to this process as the silicate partitions will prevent the acid from diffusing from one zone into the next.

BRIEF DESCRIPTION OF THE DRAWINGS

FIGS. 1 to 6 and the descriptions following below are intended for better illustration of the method specified by this invention.

FIG. 1 presents the known principle of a sensor suitable for the method described, FIG. 2 is a phase diagram of $SiO_2$—$B_2O_3$—$Na_2O$ glass, FIG. 5 is a graph of the reduction in alkali content versus depth in a borosilicate glass having a $B_2O_3$ content of about 11 percent by weight after decomposition for 7 days at 535° C., and FIG. 6 gives a section through a cylindrical sensor carrier.

DETAILED DESCRIPTION

Figure 1:
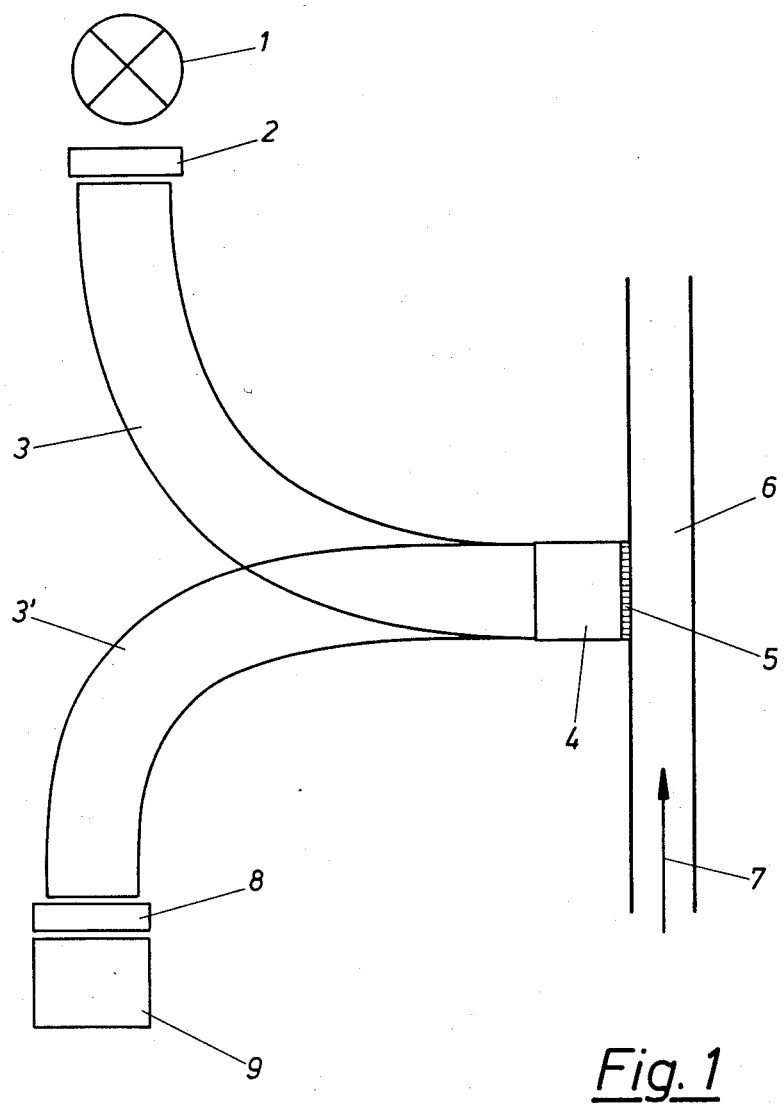

The principle of such optical sensors is presented in FIG. 1. The light required for excitation of the indicator is emitted by the light source 1, and is separated from the remaining spectral components in the optical filter 2, and is transmitted to the sensitive layer 5 carrying the indicator by the optical waveguide 3 and the sensor carrier 4. The light emitted or reflected by the layer is carried off via optical waveguides 3' and is measured by means of a photodetector 9, while interfering light components are eliminated in the optical filter 8. The sensitive layer 5 is in contact with the sample (indicated by arrows) in the measuring chamber 6.

Figure 2:
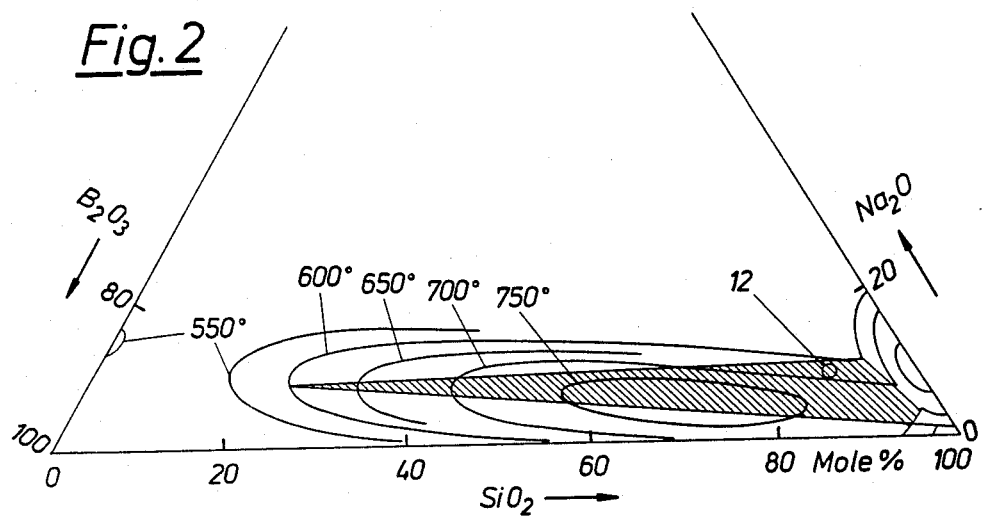

FIG. 2 shows the phase diagram with the miscibility gap of the ternary system $SiO_2$—$B_2O_3$—$Na_2O$ (cf. H. Scholze: "Glass-Natur, Struktur and Eigenschaften", 2nd edition, p. 33). The hatched area represents the miscibility gap; point 12 indicates the glass used in this example, assuming that $Al_2O_3=SiO_2$ and $K_2O=Na_2O$.

Figure 3A:
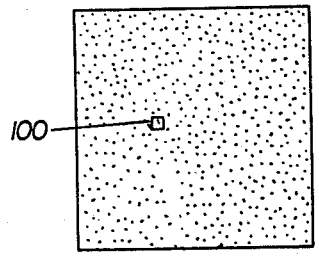
FIG. 3A shows the decomposition structure of a borosilicate glass containing more than 13 percent by weight of $B_2O_3$.
Figure 3C:
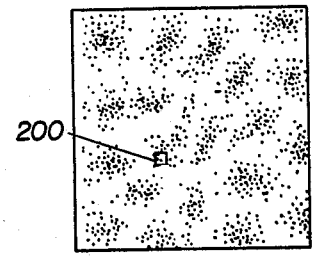
FIG. 3C shows the decomposition structure of a borosilicate glass containing less than 13 percent by weight of $B_2O_3$, FIG. 3D show, on an enlarged scale, the detail 200 of FIG. 3C.
Figure 3B:
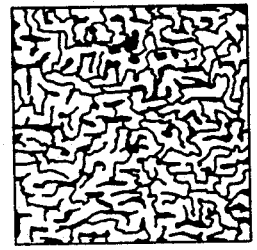
FIG. 3B shows, on an enlarged scale, the detail 100 of FIG. 3A.
Figure 3D:
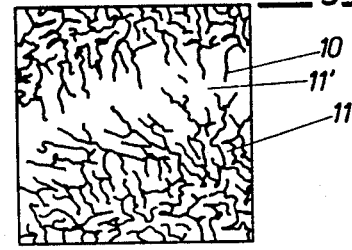

FIGS. 3A–3D show decomposition structures of borosilicate glasses, the borosilicate glass in FIG. 3A having a $B_2O_3$ content of greater than 13 percent by weight and the borosilicate glass in FIG. 3C having a $B_2O_3$ content of less than 13 percent by weight. In FIG. 3D, 10 refers to borate tubes after decomposition, 11 to decomposed silicate. As is shown in FIGS. 3C and 3D, adjoining decomposition zones are separated by silicate skins 11' acting as partitions and preventing acid diffusion.

Figure 4A:
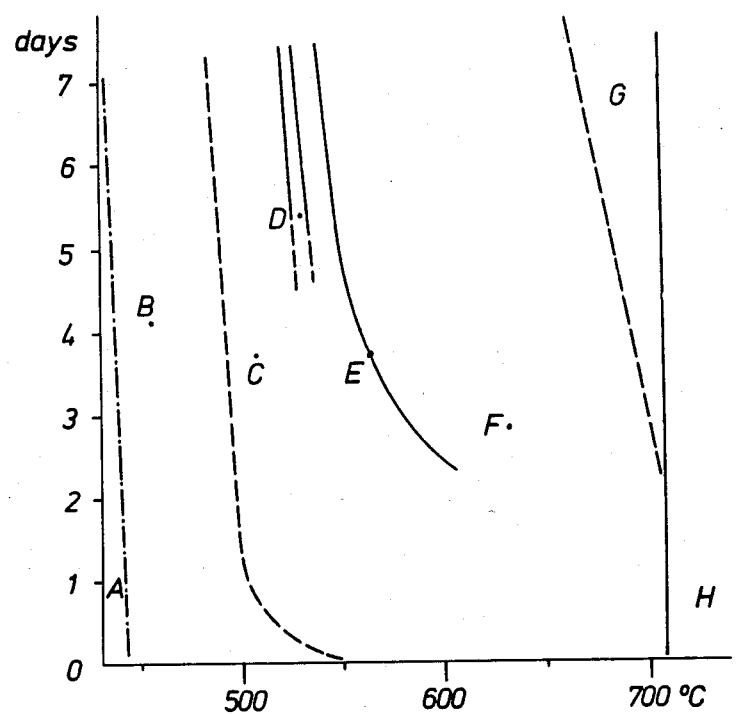
FIG. 4A is a graph of decomposition time versus decomposition temperature for borosilicate glasses having a $B_2O_3$ content of less than 13 percent by weight.
Figure 4B:
FIG. 4B represents the matrix in the borosilicate glass at point B in FIG. 4A.
Figure 4E:
FIG. 4E represents the matrix in the borosilicate glass at point E in FIG. 4A.
Figure 4C:
FIG. 4C represents the matrix in the borosilicate glass at point C in FIG. 4A.
Figure 4F:
FIG. 4F represents the matrix in the borosilicate glass at point F in FIG. 4A.
Figure 4D:
FIG. 4D represents the matrix in the borosilicate glass at point D in FIG. 4A.

Decomposition of borosilicate glasses with a content of $B_2O_3$ of less than 13 percent by weight has been investigated in the t/T space (decomposition time/-decomposition temperature) using micrographs of etched samples that were obtained with a scanning electromicroscope; the results are shown in FIG. 4A. In this diagram seven typical stages of the decomposition and phase differentiation of the glass can be seen in the t/T space.

(A) Kinetic retardation of the decomposition process, due to excessive viscosity of the glass in the temperature range of up to 450° C., approximately.

(B) Depending on the length of the experiment, tubular decomposition nuclei are found in the glass matrix at temperatures between 450° and 500° C.

(C) These nuclei will increase in numbers and grow and ramify with an increase of the time and/or temperature of the experiment.

(D) Within a very small temperature range (532±7° C.) these ramifications will rapidly grow into decomposition zones whose diameter of 5 to 20 μm will correspond to the respective borate content of the glass. As the glass matrix surrounding the decomposition structures will be depleted of almost all its boron oxide during the growth of these tubular structures, the latter will stop growing before they can form a continuous microporous structure. At this stage the glass has the ideal decomposition stucture for producing sensor carriers.

(E,F) A further increase of t and/or T will lead to a merging of the separated phases according to the principle of the minimum boundary surface, and the borate phase will form pockets and, finally, tear-shaped aggregates.

(G) At this stage differentiation of the glass will take place.

(G,H) At a temperature slightly above 700° C. the miscibility gap is left behind; above this temperature the state of the homogeneous borosilicate glass is reached once again.

As is shown by the experiments, stage D, which is best for making the carriers, demands temperature stability within a narrow range.

In a further development of the invention it has proved of advantage to perform thermal decomposition at 532±7° C., for a period of 7±1 days, if the boron oxide content of the glass is 8 to 11 percent by weight approximately.

It has been found unexpectedly found that the separated sensor carriers can hardly be rendered porous unless they are pretreated chemically or mechanically. For this reason the invention provides that in the instance of an alkaline oxide content of the untreated glass ≦3.5 percent by weight, the topmost layer of glass be removed to a depth of at least 10 μm by mechanical processes, such as abrasion or sandblasting, or by chemical means, such as treatment with an etching reagent, e.g., hydrofluoric acid, ammonium hydrogendifluoride, or alkalis.

Thus, leaching of the borate phase is facilitated by etching the glass surface with $NH_4NF_2$, HF, $CaF_2/H_2SO_4$, KOH, and/or by abrading or sandblasting it prior to the chemical treatment.

Figure 5:
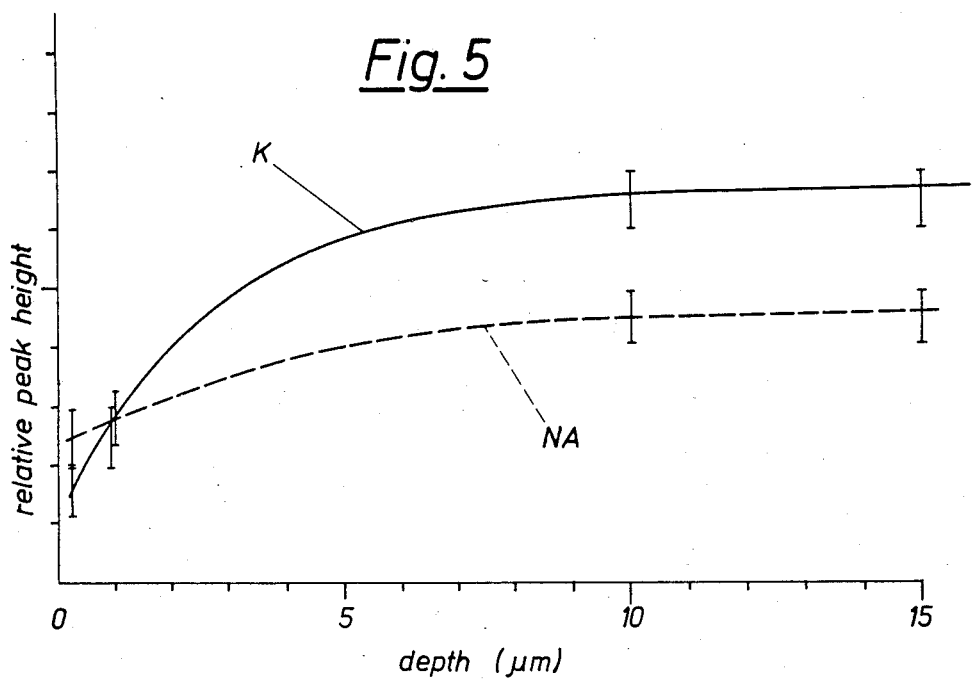

Microprobe analyses of ion-depleted glass specimens have shown that the alkali content will go down drastically towards the surface of the glass, in particular after heat-treatment for several days. FIG. 5 shows the reduction of the alkali content of borosilicate glass with a low $B_2O_3$ content, i.e., approximately 11 percent by weight, after 7 days decomposition at 535° C. (microprobe analysis of ion-depleted glass samples, peak heights of Na and K relative to Al). The alkali content starts dropping at a depth of 15 μm and will go down further towards the surface of the sample, being as low as 25% for potassium and some 50% for sodium at a depth of 0.2 μm.

This phenomenon has two major advantages for the manufacture of sensor carriers:

(1) After decomposition the glass core is surrounded by a thin cladding (not more than a few μm) of chemically resistant glass and is thus shielded against the leaching process. Porosification is only made possible by removing the cladding in specific places, for instance, by abrasion of the surface designed for carrying the sensitive layers.

(2) For reasons of application optical sensors are mostly configured as cylinders, with the top face carrying the sensitive layer; the cylinder itself should have excellent light-guiding properties.

Figure 6:
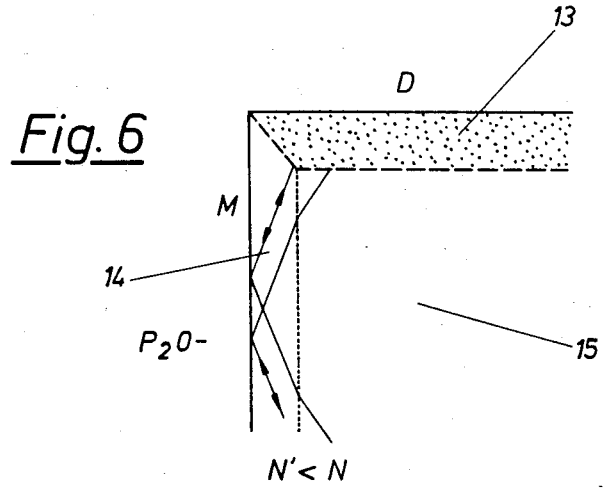

FIG. 6 shows a section through a cylindrical sensor carrier, D referring to the top face carrying the porous senosr layer 13. M refers to the side wall of the cylinder, N' to the refractive index of the periphery 14, and N to the refractive index of the glass core.

The light-guiding effect of a cylindrical rod is improved if the refractive index of this rod has a negative gradient from the center towards the periphery.

The refractive index of glasses is calculated from their composition by incremental computation.

$$\text{Glass} = \frac{1}{100} \sum_i n_i p_1$$

$n_1$ = refractive index of the individual oxidic components
$P_1$ = mole percent of oxidic components If $$n_{1(a)} > n_{1(b)}$$

with
a = $K_2O$, $Na_2O$
b = $SiO_2$, $Al_2O_3$ and $B_2O_3$ a negative gradient of the refractive index will result from a decrease of alkali oxide towards the periphery of the sensor carrier, depending on the alkali oxide content of the particular glass grade used. For a content of alkali oxide of 5 percent by weight, the refractive index would drop by 0.02 towards the periphery according to the findings of the microprobe analysis (FIG. 5).

After-treatment of the carrier material, i.e., the microporous layer, is essential. The type of treatment applied will strongly influence the properties of the sensor. In this context the present invention specifies the following steps:

(A) Complete conversion of the remaining silicate $SiO_2$—$H_2O$ backbone into $SiO_2$ by treatment with a mixture of 1 part concentrated sulphuric acid and 1 part highly concentrated nitric acid.

(B) Final heat-treatment or afterbake at 450° to 700° C., for periods varying from 10 minutes to several hours.

By applying the acid treatment before the afterbake the life of the sensor element is extended by a factor of 2 to 3. Experiments have shown that the physical and chemical constants of the immobilized indicator are strongly influenced by variations in the after-treatment. The following table indicates the pKA values of one and the same immobilized indicator of pH sensors for various alternatives of after-treatment. The sensors are based on chemical immobilization of umbelliferone-3-carboxylic acid via amide linkage, as described in DE-OS No. 33 43 636.

| Sequence of steps of after-treatment | Conditions of afterbake | pKa |
|---|---|---|
| B, A | 2 h 700° C. | 7,10–7,15 |
| B, A | ½ h 450° C. | 7,10–7,15 |
| A, B | ½ h 450° C. | 7,60 |
| A, B | ½ h 650° C. | 7,00–7,05 |

The sensors obtained with the method described here are characterized by good reproducibility of film thickness. For instance, scanning electron-micrographs show a variation of film thickness of less than ±5% for identical glass grades and constant conditions of decomposition—independent of the duration of treatment with 3 nHCl.

EXAMPLE

Glass cylinders consisting of 80±2 percent by weight $SiO_2$, 2.5±0.5 percent by weight $Al_2O_3$, 10±1 percent by weight $B_2O_3$, 0.5 percent by weight $K_2O$, 2.5 percent by weight $Na_2O$ and approximately 4 percent by weight other oxides are cured in a muffle oven at 535° C. for seven days. A layer of 15 μm is removed from the part of the surface to be rendered porous with an abrasive mixture of carborundum and glycerol.

The glass cylinders are carefully rinsed with water and are than treated with hot (95° to 98° C.) 3 nHCl for 2 to 3 days. After washing and drying the abrasion-treated surfaces of the sensor carriers have a porous structure to a depth of 10±0.3 μm.

After a two-hour treatment with a mixture of 1 part $H_2SO_4$ (98%) and 1 part highly concentrated nitric acid, and repeated rinsing with distilled water, the sensor carriers are put into a muffle oven for curing. They are then kept in a vacuum over phosphorus pentoxide until chemical immobilization of the indicator.

Semi-quantitative control of the porosification process is achieved by applying cationoid dyes, such as methylene blue, which are attached to the substrate by ionic bonding. After removal of the excess dye the sensor carrier is ready for photometric analysis. In this context it is recommended that the dye be stripped off the substrate with an acid dilution and that the solution resulting therefrom be analyzed photometrically.

We claim:

1. A method of preparing a substrate which can be used in constructing a sensor useful in measuring concentrations, activities and partial pressures of samples and which has an outer microporous layer having a thickness of 5 to 20 μm, said method comprising the steps of:
   (a) providing a borosilicate glass core containing $B_2O_3$ in an amount of 3.5 up to less than 13 percent by weight and 3.5±1.0 percent by weight of alkaline oxide,
   (b) subjecting said borosilicate glass core provided in step (a) to a selected temperature within a range of 500° and 560° C. for a treatment period of at least 3 days, said selected temperature varying no more than 10° C. during said treatment period, thereby providing a separated borate phase within said borosilicate glass core,
   (c) treating a surface portion of said borosilicate glass core to remove at least a 10 μm layer in said surface portion,
   (d) subjecting at least said surface portion of said borosilicate glass core to dilute mineral acids at a temperature of 70° to 98° C. for at least 2 days to leach the separated borate phase therein and provide an outer microporous layer having a thickness of 5 to 20 μm, and
   (e) contacting said outer microporous layer with acids and heating said borosilicate glass core, thereby providing said substrate.

2. A method according to claim 1, wherein in step (e) said microporous layer is treated with concentrated sulphuric acid and concentrated nitric acid for 2 hours at 20° C. and baked at 450° to 700° C., for a time period of between 10 minutes and and 2 hours.

3. A method according to claim 1, wherein said borosilicate glass core provided in step (a) contains about 8 to 11 percent by weight of $B_2O_3$ and wherein in step (b) said borosilicate glass core is subjected to a temperature of 532±7° C. for a period of 7±1 days.

4. A method according to claim 1, wherein said borosilicate glass core provided in step (a) contains up to 3.5 percent by weight of an alkaline oxide and wherein in step (c) the portion of the surface of the borosilicate glass core is mechanically treated.

5. A method according to claim 1, wherein said borosilicate glass core provided in step (a) contains no more than 3.5 percent by weight an alkaline oxide and wherein in step (c) the portion of the surface of the borosilicate glass core is treated with an etching reagent.

6. A method according to claim 5, wherein said etching reagent is selected from the group consisting of hydrofluoric acid, ammonium hydrogendifluoride, and alkalis.

7. A method according to claim 1, wherein said borosilicate glass core comprises

| | |
|---|---|
| $SiO_2$ | 80 ± 2 percent by weight |
| $Al_2O_3$ | 2.5 ± 1 percent by weight |
| $B_2O_3$ | 10 ± 1 percent by weight |
| $K_2O$ | 1.0 ± .5 percent by weight |
| $Na_2O$ | 2.5 ± .5 percent by weight |

8. A method of preparing a sensor useful in measuring concentrations, activities and partial pressures of samples, said method comprising the steps of:
   (a) providing a borosilicate glass core containing $B_2O_3$ in an amount of 3.5 up to less than 13 percent by weight and 3.5±1.0 percent by weight of alkaline oxide,
   (b) subjecting said borosilicate glass core provided in step (a) to a selected temperature within a range of 500° and 560° C. for at least 3 days, said selected temperature varying no more than 10° C., thereby providing a separated borate phase within said borosilicate glass core,
   (c) treating a portion of the surface of said borosilicate glass core to remove at least a 10 μm layer in said portion,
   (d) subjecting said portion of said borosilicate glass core with dilute mineral acids at a temperature of 70° to 98° C. for at least 2 days to leach the separated borate phase therein and provide an outer microporous layer having a thickness of 5 to 20 μm,
   (e) contacting said microporous layer with acids and heating said borosilicate glass core, thereby providing a substrate which has an outer microporous layer having a thickness of 5 to 20 μm, and
   (f) applying an indicator dye to said outer microporous layer.

* * * * *